July 16, 1940.　　　L. A. MEACHAM　　　2,207,748
REGULATING SYSTEM
Filed Nov. 16, 1938　　5 Sheets-Sheet 1
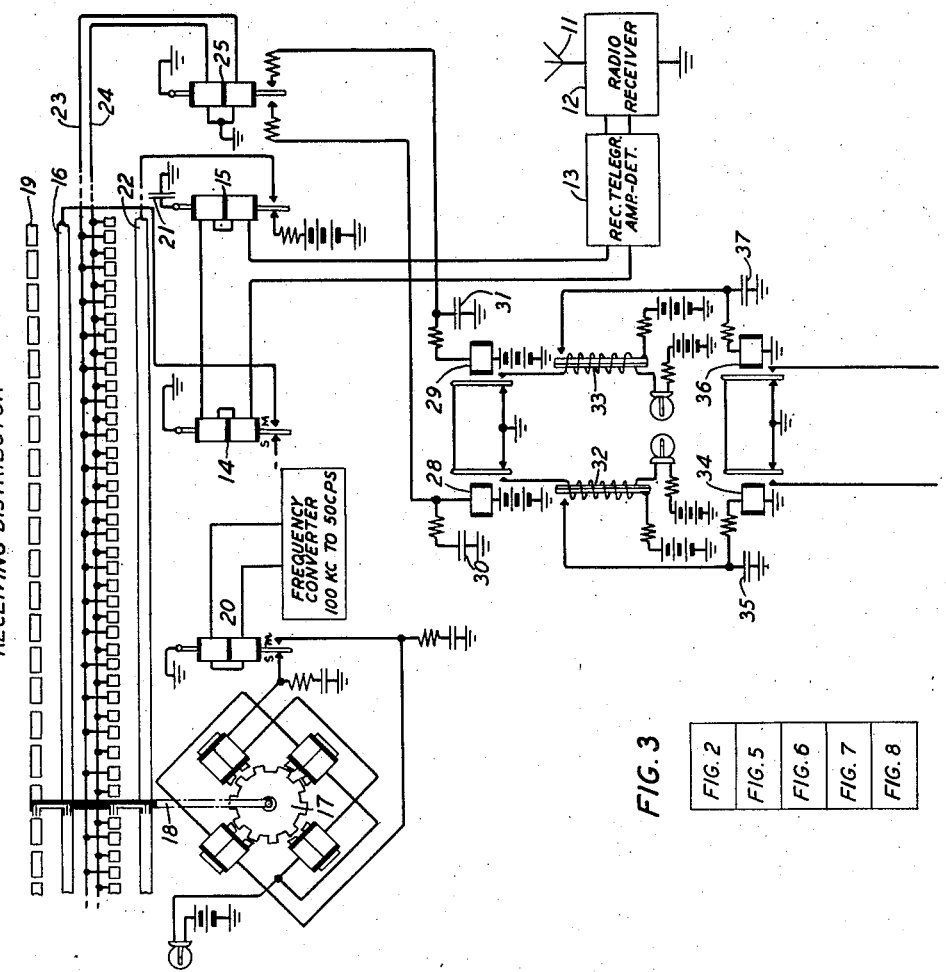
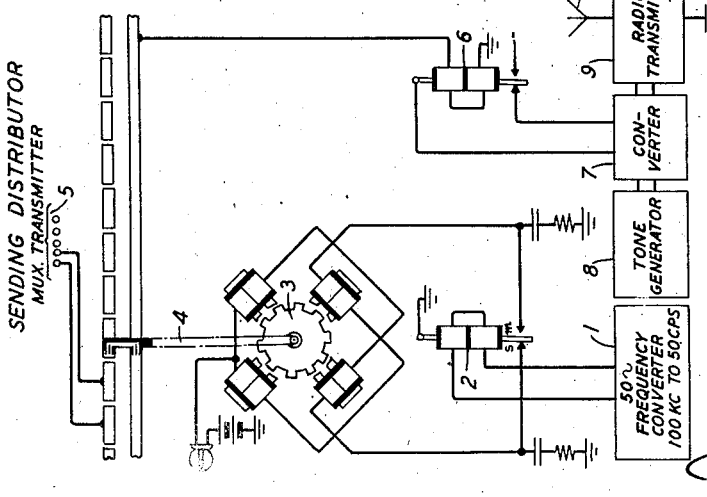
INVENTOR
L. A. MEACHAM
BY John A. Hall
ATTORNEY July 16, 1940.  L. A. MEACHAM  2,207,748
REGULATING SYSTEM
Filed Nov. 16, 1938   5 Sheets-Sheet 2
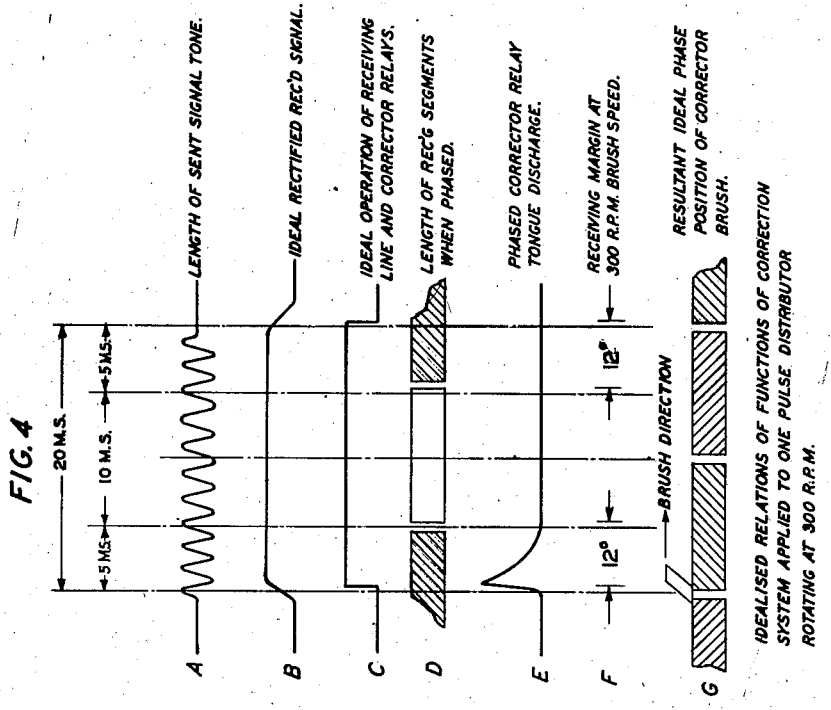
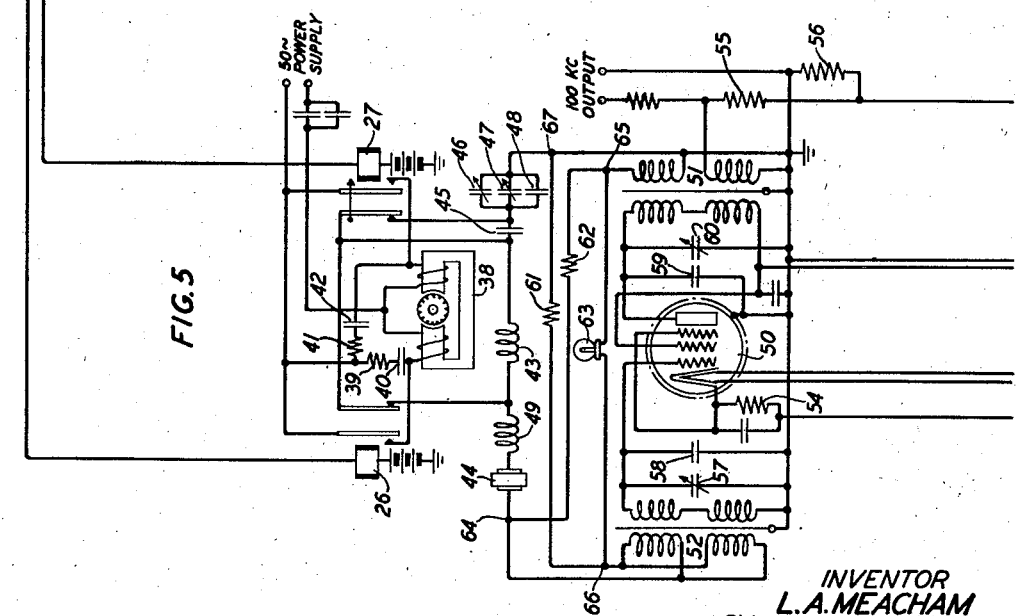
INVENTOR
L. A. MEACHAM
BY
ATTORNEY

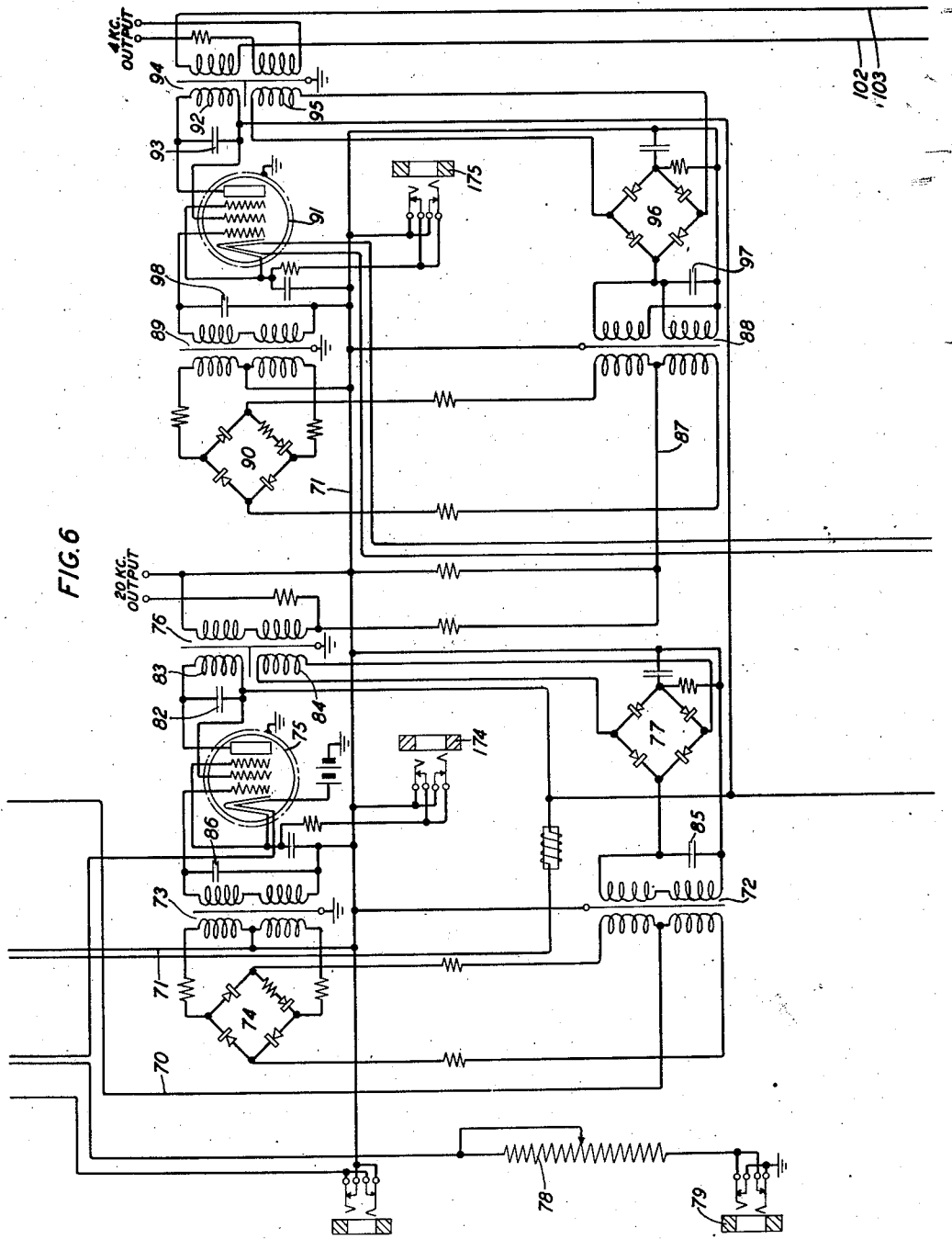

July 16, 1940.   L. A. MEACHAM   2,207,748
REGULATING SYSTEM
Filed Nov. 16, 1938   5 Sheets-Sheet 4

INVENTOR
L. A. MEACHAM
BY
ATTORNEY

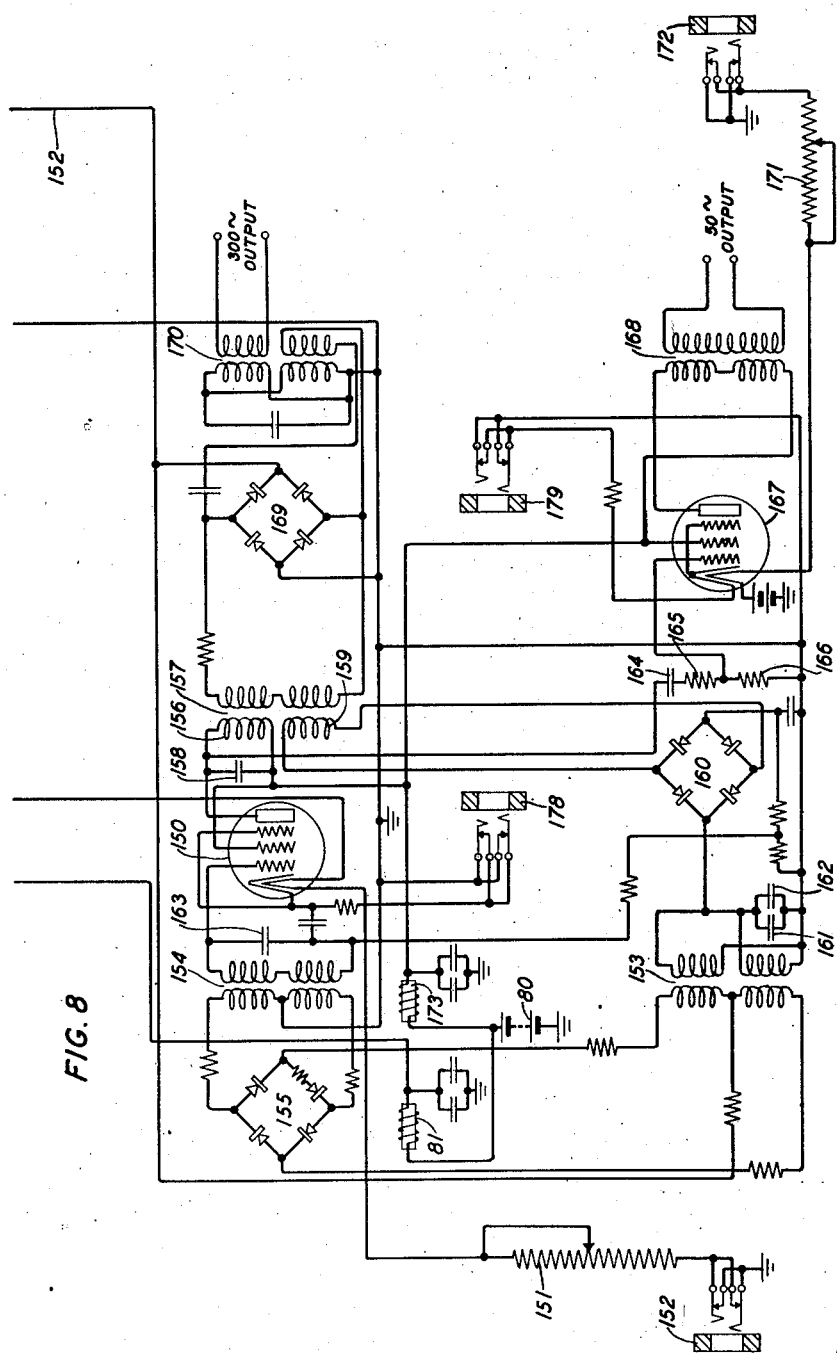

Patented July 16, 1940

2,207,748

UNITED STATES PATENT OFFICE 2,207,748

REGULATING SYSTEM

Larned A. Meacham, Verona, N. J., assignor to Bell Telephone Laboratories, Incorporated, New York, N. Y., a corporation of New York Application November 16, 1938, Serial No. 240,704

5 Claims. (Cl. 178—53)

This invention relates to regulating systems and particularly to means for keeping separate sources of frequency very accurately at the same value.

It is an object of the invention to maintain rotary distributors used for high speed telegraphy accurately in step with one another. Where such distributors are separated by great distance and where conditions are such that constant correction is impossible, each has to be driven by an independent source of frequency with such accuracy that they will not seriously depart from isochronism over a period which may extend to an hour or more. Means are then provided to make occasional and random adjustments and for the purpose a new and novel arrangement is provided whereby, when a chance for adjustment occurs, an immediate and temporary correction of comparatively large degree is made and, simultaneously therewith, a gradual and permanent correction of comparatively small degree is made. By way of example, two crystal oscillators may be used which have an accuracy of one part in a million. One may be used as a standard and the other may be corrected therefrom at random intervals. When the other has deviated from isochronism in either direction, means which is responsive to such deviation will simultaneously operate frequency correcting networks, one of which will instantaneously change the frequency by a value of ten parts in a million and the other of which will change the frequency at a rate of five parts in a million in a period of about twenty minutes. Thus, if the deviation responsive means is operated for only a very short time, the frequency will have been altered ten parts in a million temporarily for such short time and simultaneously therewith a very small alteration which remains as a permanent change will have been made. The object is to make an immediate change to bring the rotary distributors back into exact phase with one another and at the same time make a permanent change in the frequency of the source to be corrected to compensate for the influence which has caused the deviation.

A feature of the invention is a relay means responsive to deviation in either a leading or lagging direction. In either direction such relay means will alter the electrical constants of the crystal oscillator circuit and simultaneously cause an extremely slow alteration of another electrical constant of such circuit in the proper direction. Upon restoration to normal of such relay means, the circuit will return to the condition in which it was found, except for the small alteration which was slowly made which now becomes permanent until further correction takes place.

In the form shown, the relay means inserts an inductance in the crystal circuit and energizes a small motor to operate a variable condenser, also in such circuit, when the source to be adjusted is leading and inserts a condenser and energizes the small motor in the opposite direction when the source to be adjusted is lagging. It is to be understood, however, that such specific means are only illustrative and that other means may come within the scope of this invention.

The drawings consist of five sheets which are arranged as indicated in Fig. 3.

Fig. 1 is a schematic diagram of a transmitting distributor and the associated apparatus for transmitting permutation code impulses over a channel here illustrated as a radio link.

Fig. 2 is a circuit diagram, part of which is shown schematically and which illustrates a receiving distributor for translating the incoming permutation code impulses and feeding them to a printer. The lower part of the figure is a circuit diagram illustrating the correcting circuits for keeping the distributor motor of Fig. 2 in exact synchronism with the distributor motor of Fig. 1. The circuit diagram of Fig. 2 continues through the other sheets of the drawings as indicated in Fig. 3 and enters Fig. 5. This is a circuit diagram showing a crystal oscillator accurately adjusted to 100 kilocycles together with certain correcting means for slightly changing the frequency of this crystal circuit so as to keep it in exact synchronism with a similar crystal circuit at the sending end.

Figs. 6, 7 and 8 are circuit diagrams of frequency changing networks to bring the 100 kilocycles output of the crystal down step by step until a 50-cycle current is finally generated. This 50-cycle current is used for driving the motor of Fig. 2.

Fig. 4 is an explanatory diagram showing the idealized relations of the functions of the correction system applied to one marking pulse.

Figure 7:
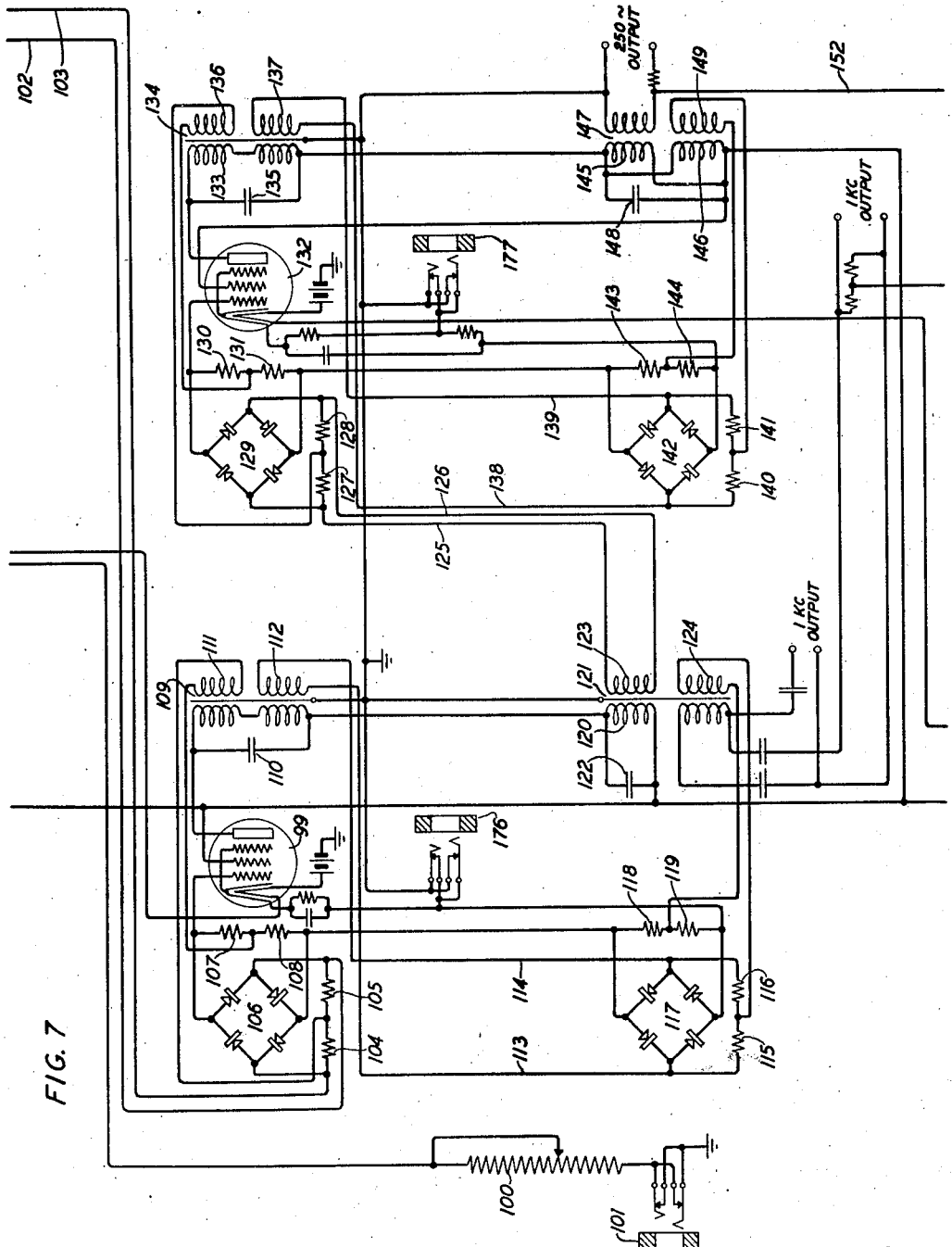

The system schematically illustrated in Figs. 1 and 2 is explained in considerable detail in the application of Cole and Melhose, Serial No. 219,964, filed July 19, 1938. In Fig. 1 the box I represents a source of 50-cycle frequency. This continuously operates relay 2 which vibrating its armature at the rate of 50 cycles per second drives motor 3 of a well-known type which need not be described in any more detail. Motor 3 drives a distributor arm 4 over a distributor face and sequentially connects the leads from a multiplex transmitter 5 to the segments of the distributor and thence to a sending relay 6. This sending relay operates a converter 7 which divides a tone from a tone generator 8 into spacing and marking impulses which are then fed into a radio transmitter 9 and transmitted over the antenna 10 to the antenna 11 of the receiving device of Fig. 2. In Fig. 2 the antenna 11 is connected to a radio receiver 12 whose output is connected to an amplifier detector 13 wherethrough the relays 14 and 15 are operated in accordance with the signals sent out from the transmitter. Relay 14 has its marking contact connected to ring 16 and as the motor drives the distributor arm 18 causes appropriate marking and spacing impulses to be distributed to the segments such as 19 from which they are fed into a printing device.

The motor 17 of well-known design is driven from a source of 50-cycle current through the driving relay 20 in the same manner as the motor 3 is driven by the relay 2. In order to keep the motor 17 in exact synchronism with the motor 3 a corrector relay 15 is provided. This relay has a condenser 21 connected to the armature of the relay which becomes charged in a circuit from ground, condenser 21, the armature and spacing contact of relay 15 to battery. Whenever a marking impulse is received relay 15 moves its armature to its marking contact and discharges the condenser 21 through a circuit including the ring 22 and some one of the segments connected either to conductor 23 or conductor 24 resulting in the operation of relay 25 in either one or the other direction.

As will appear hereinafter, if the motor 17 is being driven too fast relay 25 will eventually cause the operation of relay 26 in Fig. 5 whereas, if the motor 17 is running too slow relay 25 will cause the operation of relay 27 in Fig. 5.

Let us consider the relations of the functions of the correction system as illustrated in Fig. 4. The illustration in the last line marked G shows the relation of the segments connected to the conductors 23 and 24 in relation with the segments shown in line D illustrating the segments such is 19. The segments in line G are those used for correction while the segments in line D are those used for the transmission of spacing and marking impulses to the multiplex receiving printer. In line D the middle segment is shown with no hatching to indicate a live signal or one connected to the printer, those to either side are unconnected. From an ideal standpoint, a received signal tone should occupy a full 20 milleseconds for example, as shown in line A. Line B shows such a signal rectified in an ideal manner and line C indicates the time of operation of relays 14 and 15. Line E represents the discharge of condenser 21 as relay 15 operates and line G indicates the brush bridging two segments so that effectively the condenser discharge E is divided equally in conductors 23 and 24 and sets up opposing forces in relay 25 so that this relay fails to operate. If the motor 17 is running too fast then the brush indicated in line G of Fig. 4 will be advanced from the position shown and the condenser discharge will go wholly into conductor 23 and cause the relay 25 to move to its left-hand contact. If the motor 17 is running too slow then the brush indicated in line G will not have reached the position shown and the condenser discharge will go wholly into conductor 24 causing the relay 25 to move its right-hand contact.

A relay 28 is operated by the left-hand contact of relay 25 and a relay 29 is operated by the right-hand contact. These relays are extremely fast operating and through the use of condensers 30 and 31 they are rendered somewhat slow to release, the condensers forming what are known as hangover circuits. If relay 25 vibrates equally between its right- and left-hand contacts both relays 28 and 29 will operate. While relay 28 connects its armature to the winding of relay 32 it will not operate this relay unless relay 29 is deenergized. In the same manner while relay 29 connects its armature to the winding of relay 33 it will not operate this relay unless relay 28 is deenergized. Therefore if relay 25 vibrates its armature quickly between its two contacts and both relays 28 and 29 become operated then neither relay 32 nor 33 will operate.

If the motor 17 is fast then relay 28 will be occasionally operated, that is, relay 25 will operate to its left-hand contact each time a spacing impulse is followed by a marking impulse received over the radio receiver 12. In this case then relay 32 will receive an occasional impulse. This relay is what is known as a thermal relay and does not operate immediately but will operate eventually if it reaches a sufficient number of impulses one following closely another. The operation of relay 32 causes the operation of relay 34 and since the relay 32 due to its nature may not firmly close its contact, a hangover circuit in the form of condenser 35 is provided to cause the operation of relay 34. Relay 36 and condenser 37 correspond to relay 34 and condenser 35 on the slow side. Here again it will be noted that the armature and contact arrangements of relays 34 and 36 are similar to the armature and contact arrangements of relays 28 and 29. Thus, if as above-mentioned, the motor 17 is fast, relay 34 will become energized and relay 36 not being energized a circuit will be established from ground to the back contact and armature of relay 36, the armature and front contact of relay 34 to the winding of relay 26. The train of relays from the left-hand contact of relay 25 to the winding of relay 26 is provided to insure an operation for relay 26 which will definitely indicate the fast running of the motor 17 and will not be the result of random impulses caused by static or other unstandard conditions.

In Fig. 5 there is shown a motor 38 which is driven from a source of 50 cycles. When both relays 26 and 27 are nonoperated this motor 38 does not move because no current is caused to flow in its windings. If relay 26 becomes operated then this relay through its inner armature short-circuits resistance 39 and condenser 40 and hence 50-cycle current will flow through the left-hand field winding of the motor and cause the motor to operate in one direction. If the relay 27 is operated then resistance 41 and condenser 42 are short-circuited and 50-cycle current flows through the right-hand field winding of the motor and causes it to operate in the opposite direction. Thus as long as relay 26 remains operated the motor 38 will rotate in one direction and as long as relay 27 remains operated motor 38 will rotate in the opposite direction.

When relay 26 becomes operated, a short circuit normally about the inductance 43 is opened and this causes a change of one nature in the circuit of crystal 44. When relay 27 is operated this opens a short circuit normally placed about the condenser 45 and causes a change of another nature in the circuit of the crystal 44. Motor 38 operates the variable condenser 46 and thus causes a change in the circuit of crystal 44, in either one or the other direction according to the direction of rotation of motor 38. Condenser 47 is manually adjusted to keep condenser 46 near the middle of its range under working conditions. Condenser 48 is a fixed value. Thus motor 38 driving variable condenser 46 makes only a very small change in the capacity at this point and hence makes only a very small change in the frequency of this circuit when moved over its full range.

Let us say that the relay 26 is operated for a short period, in this case inductance 43 is introduced into the circuit of crystal 44 and the condensers 46, 47 and 48 are gradually adjusted in a direction to cause the same effect as the introduction of inductance 43. The inductance 43 causes a comparatively great change in the circuit of crystal 44 while the condensers 46, 47 and 48 cause a comparatively small change in this circuit. Thus when relay 26 is operated there is an immediate change of comparatively great degree which is of a temporary nature because when relay 26 is released this change ceases. The change caused by condenser 46, however, becomes permanent because the motor 38 has moved this condenser to a new position and when the motor stops rotating the condenser stays in the position to which it has been moved. In a similar manner if relay 27 is operated for a short period, condenser 45 is introduced into the circuit of crystal 44 and condenser 46 is moved slowly in the opposite direction. Thus relay 27 during its operation causes a change in the crystal circuit of comparatively large degree temporarily and a change of small degree permanently.

The remainder of Fig. 5 constitutes an oscillation generator controlled by the crystal 44 and having an output of 100 kilocycles. Such an oscillation generator forms the subject-matter of my patent application, Serial No. 151,564, filed July 2, 1937, and hence only a general description will be given here. This oscillation generator comprises a vacuum tube 50 preferably of the screen grid high amplification type and a feedback path between the output and input circuits of the tube including an output transformer 51, a frequency selective Wheatstone bridge network and an input transformer 52. Energizing circuits for the vacuum tube are provided as shown, the negative biasing potential for the control grid being obtained from a resistor 54 in the cathode lead which is traversed by the plate current. The grid bias is preferably large to prevent the flow of grid current in normal operation. A load impedance, which in this case is the input circuit of a frequency converter, shown in Fig. 6, is connected to the secondary winding of output transformer 51 through a pad consisting of resistors 55 and 56.

It is desirable that the transformers 51 and 52 should introduce a very small phase shift and that the phase of the feedback should be controlled substantially exclusively by the selective bridge network. The transformers may be tuned by condensers, such as 57, 58, 59 and 60 which may be adjusted to make the transformer phase shift substantially zero at any desired frequency.

Two opposite arms of the network comprise resistors 61 and 62 which are preferably equal. A third arm comprises a variable resistance device 63 such as the filament of a lamp whose resistance increases with temperature rise, and the fourth arm includes a piezoelectric crystal 44, inductances 43 and 49, condensers 45 and 48 and variable condensers 46 and 47. The frequency selective combination including the piezoelectric crystal, the two inductances and the condensers exhibit a series resonance at a frequency somewhere near the series resonance of the crystal. Since the addition of a series inductance gives rise to a second resonance at a high frequency the value of inductances 49 and 43 should be very small so that the second resonance is far removed from that of the crystal. The transformers in the feedback path then operate to prevent possible oscillation at this frequency. Further, if the inductance is small any variations of its value will have correspondingly small effect on the oscillation frequency. The means for including and excluding inductance 43 from the circuit and the means for including and excluding condensers 45 to 48 and for adjusting the condenser 46 are provided for the purpose of adjusting this oscillation frequency to a desired value. At its resonance frequency, the impedance of the selective branch becomes purely resistive, its value being that of the resistance representing the dissipation in the circuit. Resistors 61 and 62 and device 63 should preferably have resistance of approximately this same value so that the bridge is only slightly unbalanced at the resonance frequency. The amount of the feedback is dependent on the degree of the bridge unbalance but by using a high gain amplifier, sufficient feedback to maintain oscillation can be obtained with a very small unbalance.

One pair of diagonally opposite corners 65 and 67 are connected to the output terminals of transformer 51 and the other pair 64 and 66 are connected to the terminals of the input transformer 52. The requisite phase of the feedback for the production of oscillations may be obtained by poling the connections of one or the other of the transformers or by interchanging the connections of the bridge corners.

The operation of the system is as follows: Assuming that the transformers produce no phase shift the phase of the feedback becomes 180 degrees at the resonance frequency of the selective impedance between the points 64 and 67 at which frequency the bridge circuit is purely resistive. Because of the purely resistive character of the bridge and of the absence of phase shift in the transformers, the feedback phase is independent of the non-linear resistance of the tube and oscillations occurring at this frequency are stable. Furthermore under the assumed conditions, the phase shift of the feedback can take the value of 180 degrees only at this resonance frequency.

Assuming the initial unbalance of the bridge to be such as to provide sufficient feedback, oscillations will start and will grow in amplitude until a condition of equilibrium is reached. Ordinarily this condition of equilibrium is reached only after the grid path of the vacuum tube becomes conductive and depends on the value of the grid path resistance. In the circuit of the invention, however, the steady oscillation amplitude is controlled and maintained by the automatic regulating action of the feedback network itself, the grid path of the tube remaining non-conductive. For this purpose the variable resistance device is so disposed in the circuit and has such characteristics that, as the oscillation amplitude increases, the bridge tends to become more nearly balanced thereby diminishing the feedback. For example, if the device 63 consists of a metallic filament lamp its resistance will have a positive temperature coefficient and will increase with increasing strength of the current traversing it. In this case the resistance of the lamp when cold should be less than that of the other bridge branches or less than is required to effect a balance of the bridge. The feedback at the moment of inception of the oscillations will be large but as the amplitude increases the temperature of the lamp filament will increase and also its resistance, thereby tending to bring the bridge into balance and to diminish the feedback. At some value of the current amplitude the lamp resistance would be such as to balance the bridge completely, thereby reducing the feedback to zero. Obviously, the oscillation amplitude cannot reach this value but can only approach it asymptotically.

By the use of the bridge circuit arrangement, small changes in the lamp resistance have a multiplied effect on the amount of the feedback and a strong control is obtained which holds the oscillation amplitude constant with a high degree of accuracy. Adjustment of the operating amplitude to a desired value may be effected by changing the value of one or the other of fixed resistors 61 and 62. Adjustment of the oscillator output may be effected by variation of resistors 55 and 56.

The use of temperature controlled linear resistances such as lamp filament 63 has the advantage that the control of the amplitude is effected without the production of wave form distortion. The control of the amplitude by means external to the tube also permits the tube to be operated without the overloading and consequent wave form distortion which ordinarily occur when the tube resistances control the amplitude.

Because of parasitic impedances or because of secular variation of the impedances external to the bridge, it may be found that the over-all feedback phase of 180 degrees is obtained at some frequency different from that of the resistance of the frequency selective bridge arm. Under this condition, the phase shift in the bridge itself must be slightly different from 180 degrees at the oscillation frequency, the departure being just enough to compensate the phase shift in the other parts of the feedback path. The effect of this upon the frequency stability is made negligibly small by the operation of the bridge in a nearly balanced condition and is further reduced by the use of elements in the frequency selective branch of the bridge having reactances that vary strongly with frequency at the resonance of the branch. A piezoelectric quartz crystal is well suited for this purpose.

Fig. 6 shows two regenerative modulation frequency conversion circuits each of which is tuned to produce a frequency at its output terminals one-fifth the frequency at its input terminals. Thus, the left-hand portion of this circuit diagram shows a frequency converter taking the 100-kilocycle output of the oscillation generator of Fig. 5 and delivering a frequency of 20 kilocycles and the right-hand circuit diagram takes the 20-kilocycle output of the left-hand frequency converter and delivers a frequency of 4 kilocycles. The theory of operation of these circuits is given in considerable detail in the application of R. L. Miller, Serial No. 156,698, filed July 31, 1937, and for that reason only a general description will be given here.

The output of the 100-kilocycle oscillation generator is delivered over conductors 70 and 71, the latter being a ground connection. Conductor 70 connects to the mid-point of the left-hand winding of transformer 72, while conductor 71 connects to the mid-point of the left-hand winding of transformer 73. The two other terminals of the left-hand winding of transformer 72 connect across one diagonal of a four-element copper oxide rectifier bridge 74 functioning as a modulator, while the other diagonal of this modulator is connected to the two outer terminals of the left-hand winding of transformer 73. The right-hand winding of transformer 73 is connected to the grid-cathode circuit of an amplifier comprising a single vacuum tube 75, of the pentode type.

The anode-cathode circuit of the amplifier tube 75 includes the upper left-hand winding 83 of a combined output and feedback transformer 76. The winding 83 and the condenser 82 in shunt therewith form a circuit tuned to one-fifth the input frequency or 20 kilocycles. A feedback winding 84 of the transformer 76 is connected to the right-hand winding of transformer 72 through a feedback circuit including a copper oxide rectifier bridge 77 operating as a frequency multiplier. The right-hand winding of transformer 72 is shunted with a condenser 85 and the combination of this winding and the condenser 85 forms a circuit tuned to four-fifths the input frequency of this circuit or 80 kilocycles.

The 80-kilocycle current modulates the 100-kilocycle current through the agency of modulator 74 and the circuit comprising the right-hand winding of transformer 73 and the condenser 86 being tuned to 20 kilocycles, selects that component of the modulated current traversing the windings of transformer 73 so that a sustained frequency of 20 kilocycles is found in the transformer 76. The right-hand winding of this transformer feeds into the output circuit of this frequency converter.

Suitable heating current is supplied to the heater type cathode of amplifier tubes 75 and 50 in series and is adjusted by a rheostat 78 and may be measured by plugging an ammeter circuit into jack 79. Potential for the plate of tube 75 is supplied by the battery 80 (Fig. 8) through a retardation coil 81 in series with the anode-cathode circuit winding of transformer 76.

The 20-kilocycle output of the left-hand portion of the circuit of Fig. 6 is delivered over conductors 87 and 71, the latter being a ground connection. Conductor 87 connects to the mid-point of the left-hand winding of transformer 88, while conductor 71 connects to the mid-point of the left-hand winding of transformer 89. The two outer terminals of the left-hand winding of transformer 88 are connected across one diagonal of a four-element copper oxide rectifier bridge 90 functioning as a modulator while the other diagonal of this modulator is connected to the two outer terminals of the left-hand winding of transformer 89. The right-hand winding of transformer 89 connects to the grid-cathode circuit of an amplifier comprising a single vacuum tube 91 of the pentode type. The anode-cathode circuit of the amplifier tube 91 includes the upper left-hand winding 92 of a combined output and feedback transformer 94. The winding 92 and the condenser 93 in shunt therewith form a circuit tuned to one-fifth the input frequency or 4 kilocycles. A feedback winding 95 of the transformer 94 is connected to the right-hand windings of transformer 88 through a feedback circuit including the copper oxide rectifier bridge 96 operating as a frequency multiplier. The right-hand windings of the transformer 88 are connected in parallel and have a condenser 97 connected in parallel with them. This forms a circuit tuned to four-fifths of the input frequency or 16 kilocycles. The 16-kilocycle current is fed through the left-hand winding of transformer 88 to the modulator 90 where it acts to modulate the 20-kilocycle current delivered thereto over conductors 87 and 71. The right-hand winding of transformer 89 has a condenser 98 in shunt therewith and forms a circuit tuned to 4 kilocycles; hence, the modulated component of the current traversing the left-hand winding of the transformer 89 traverses the amplifier 91 and appears as a sustained frequency of 4 kilocycles in the output or right-hand winding of transformer 94.

Suitable heating current is supplied to the heater type cathodes of amplifying tubes 91 and 99 in series and is adjusted by rheostat 100 and may be measured by plugging an ammeter circuit into jack 101. Potential for the plate of tube 91 is supplied by a battery 80 (Fig. 8) through retardation coil 81 in series with the anode-cathode circuit winding of transformer 94.

The 4-kilocycle output of the frequency converter comprising the right-hand portion of the circuit diagram of Fig. 6 is delivered over conductors 102 and 103 where it connects to the outer terminals of a potentiometer comprising resistances 104 and 105 and since these points are also connected to one diagonal of a four-element copper oxide rectifier bridge 106 functioning as a modulator, this 20-kilocycle output is accordingly connected to the modulator. The other diagonal of the modulator 106 is connected to the outer terminals of a potentiometer comprising resistances 107 and 108 which connects to the grid-cathode circuit of an amplifier comprising a single vacuum tube 99 of the pentode type. The anode-cathode circuit of this tube 99 connects to the right-hand winding of a transformer 109 and this winding being shunted by a condenser 110 forms a circuit tuned to one-half the frequency of the input, in this case, 2 kilocycles. The upper right-hand winding 111 of transformer 109 connects to the two mid-points of the potentiometers, hereinbefore mentioned, comprising in one case the resistances 104 and 105 and in the other case, resistances 107 and 108. The 2-kilocycle current of the tuned portion of transformer 109 modulates the 4-kilocycle current delivered over conductors 102 and 103 with the result that a sustained frequency of two kilocycles is found in transformer 109.

An output winding 112 of the transformer 109 feeds through conductors 113 and 114 to the outer terminals of a potentiometer comprising resistances 115 and 116 and at the same time connects to one diagonal of the four-element copper oxide rectifier bridge 117 functioning as a modulator. The other diagonal of this modulator connects to the outer terminals of a potentiometer comprising the resistances 118 and 119. This last potentiometer, in series with the potentiometer comprising the risistances 107 and 108, is in the grid-cathode circuit of the tube 99. Winding 120 of a transformer 121 is in series with the left-hand winding of transformer 109 and by the same token is included in the cathode-anode circuit of tube 99. Winding 120 is tuned by the condenser 122 to a frequency of 1 kilocycle. A feedback winding 124 of the transformer 121 connects to the two mid-points of the potentiometers comprising, in one case, the resistances 115 and 116 and in the other case, the resistances 118 and 119 with the result that the current supplied over conductors 113 and 114 is modulated by the current derived by winding 124 of the transformer 121. The combined action of modualtors 106 and 117 and the transformers 109 and 121 results in a sustained output of 1 kilocycle in the output winding 123 of the transformer 121.

The 1-kilocycle output of the frequency converter shown in the left-hand portion of the circuit diagram in Fig. 7 is delivered over conductors 125 and 126. These conductors connect to the outer terminals of a potentiometer comprising resistances 127 and 128 and at the same time connect to one diagonal of a four-element copper oxide rectifier bridge 129, functioning as a modulator. The other diagonal of this modulator connects to the outer terminals of a potentiometer comprising resistances 130 and 131, which potentiometer is included in the grid-cathode circuit of an amplifier comprising a single vacuum tube 132 of the pentode type. The anode-cathode circuit of this vacuum tube includes the left-hand winding 133 of a combined output and feedback transformer 134 and since this winding 133 is shunted by a condenser 135 it is tuned to a frequency of one-half the input, or 500 cycles. A feedback winding 136 connects to the mid-points of the two potentiometers comprising in the one case resistances 127 and 128 and in the other case resistances 130 and 131. The 500-cycle output of the winding 136 modulates the 1-kilocycle or 1000-cycle input through the agency of the modulator 129, with the result that a sustained frequency of 500 cycles is found in the transformer 134.

The 500-cycle current is delivered by the output winding 137 of transformer 134 to conductors 138 and 139 where it connects to the outer terminals of a potentiometer comprising resistances 140 and 141 and also to one diagonal of a four-element copper oxide rectifier bridge 142 functioning as a modulator. The other diagonal of this modulator connects to the outer terminals of a potentiometer comprising resistances 143 and 144 and this potentiometer, being in series with the potentiometer comprising resistances 130 and 131, is in the grid-cathode circuit of the amplifier tube 132. The anode-cathode circuit of tube 132 also includes windings 145 and 146 of a transformer 147. These two windings in parallel and having a condenser 148 in parallel with them form a circuit tuned to one-half the frequency of the input or, in this case, 250 cycles. The 250 cycles of this transformer is fed from a feedback winding 149 to the midpoints of the potentiometers comprising in one case resistances 140 and 141 and in the other case resistances 143 and 144, with the result that the modulated current gives rise to a sustained frequency of 250 cycles in the transformer 147.

Suitable heating current is supplied to the heater type cathode of amplifier tube 132 and amplifier tube 150 in series and is adjusted by a rheostat 151 and may be measured by plugging an ammeter circuit into jack 152. Potential for the plate of tube 132 is supplied by battery 80 through a retardation coil 81 in series with the anode-cathode circuit windings of transformers 147 and 134.

The 250-cycle output of the transformer 147 is connected to ground in one case and conductor 152 in the other, and through this means is supplied to the mid-points of the left-hand windings of transformers 153 and 154. The outer terminals of the left-hand winding of transformer 153 are connected to one diagonal of a four-element copper oxide rectifier bridge 155, functioning as a modulator, while the other diagonal of this bridge is connected to the outer terminals of the left-hand winding of transformer 154. The right-hand winding of transformer 154 is connected to the grid-cathode circuit of an amplifier comprising a single vacuum tube 150 of the pentode type. The anode-cathode circuit of this tube includes a winding 156 of transformer 157 and since the winding 156 is shunted by a condenser 158 it forms a circuit tuned to one-fifth the input frequency, or 50 cycles. A feedback winding 159 of transformer 157 is connected to the left-hand windings of transformer 153 through a four-element copper oxide rectifier bridge 160, acting in this case as a frequency multiplier. The right-hand windings of transformer 153 and condensers 161 and 162, all in multiple, form a circuit tuned to four-fifths the input frequency, or 200 cycles. The 200 cycles then in the left-hand windings of transformer 153 modulate the 250 cycles delivered to this frequency converter over conductor 152 and the tuned circuit comprising the right-hand windings of transformer 154 shunted by a condenser 163 selects the proper component of this modulated current, with the result that a sustained frequency of 50 cycles is found in the transformer 157. A 50-cycle potential taken from the plate circuit of tube 150 and connected through condenser 164 and a potentiometer comprising resistances 165 and 166 supplies a connection to the grid circuit of an amplifier comprising a single vacuum tube 167 of the pentode type. The anode-cathode circuit of this tube includes the left-hand winding of a transformer 168, the right-hand winding of which forms the output circuit for 50-cycle current to be used to run the motor 17 (Fig. 2) and the motor 38 (Fig. 5).

The 250-cycle current delivered over conductor 152 is also connected to a modulator 169 and there modulated by the 50-cycle output of transformer 157, with the result that a sustained frequency of 300 cycles is found in transformer 170.

Suitable heating current is supplied to the heater type cathode of amplifier tube 167 and is adjusted by a rheostat 171 and may be measured by plugging an ammeter circuit into jack 172. Potential for the plates of tubes 150 and 167 is supplied by battery 80 through a retardation coil 173 in series with the transformer winding 156 in one instance and the left-hand winding of transformer 168 in the other instance.

In Figs. 6, 7 and 8 it will be noted that certain terminals are marked "20-kc. output," "4-kc. output," "1-kc. output," "250-cycle output," "300-cycle output" and "50-cycle output." While these terminals play no active part in the present invention they represent actual wiring and are used for testing purposes. Likewise, jacks 174, 175, 176, 177, and 178 and 179 are provided for the purpose of testing the operation of these circuits.

The fractional division of the input frequency of these various frequency converters is strictly accurate, so that with a crystal 44 very accurately fashioned and adjusted to give a 100-kilocycle output the final frequency of 50 cycles bears a constant and fixed relation to the output of the crystal circuit. When the motor 17 runs fast, and as a result the relay 26 is operated, then the inductance 43 is introduced into the circuit of crystal 44 to very slightly reduce the frequency of this arm of the oscillator bridge. All the time that relay 26 remains operated, the motor 38 is moving to adjust the condenser 46 to also slow down the rate of oscillation in this arm of the bridge. During the period of operation of relay 26, then, the introduction of inductance 43 causes a temporary and comparatively great change in the crystal circuit and during this period there is going forward a progressive change in the same direction through the agency of motor 38. When relay 26 releases, the temporary change caused by the introduction of inductance 43 ceases but the change introduced by the movement of condenser 46 remains although motor 38 ceases to operate.

In like manner, if the motor 17 runs too slow then relay 27 will operate and by introducing the condenser 45 into the crystal circuit and by causing the operation of motor 38 in the opposite direction, will operate to correct the speed of motor 17. The introduction of the condenser 45 being of a temporary nature, tends to bring the motor 17 back into phase but the movement of condenser 46 being of a permanent nature acts as a means to correct the condition which caused the slowing of the motor 17.

The rectangle 1 in Fig. 1 marked "50-cycle frequency converter" is of the same nature as the apparatus shown in Figs. 5 to 8, inclusive, with the exception that there are no variable elements in the crystal circuit. The crystal used there and the crystal 44 corresponding to it are of highly accurate design and are carefully selected to be as nearly equal to each other in frequency as possible.

What is claimed is:

1. In a frequency regulating system, a source of standard frequency, a source of frequency to be regulated, a signaling channel, means under control of said standard frequency to transmit signals over said signaling channel, means at the far end of said channel responsive to said signals, said means including two relays, one responsive to deviation in one direction and the other responsive to deviation in the other direction, frequency altering networks controlled by said relays, said networks each comprising a means for immediately and temporarily making a comparatively great alteration in the frequency to be regulated and a means for gradually and permanently making a comparatively small alteration in the frequency to be regulated.

2. In a frequency regulating system, a source of standard frequency, a source of frequency to be regulated, a signaling channel, means under control of said standard frequency to transmit signals over said signaling channel, means at the far end of said channel responsive to said signals, said means including two relays, one responsive to deviation in one direction and the other responsive to deviation in the other direction, frequency altering networks controlled by said relays, said networks each comprising a means directly responsive to said relays for immediately and temporarily making a comparatively great alteration in the frequency to be regulated, and a means adjustable through the movement of a motor controlled by said relays for gradually and permanently making a comparatively small alteration in the frequency to be regulated.

3. In a frequency regulating system, a source of frequency to be considered standard, a rotary distributor driven from said source, another source of frequency to be regulated, a rotary distributor driven from said regulated source, relay means responsive to deviation from isochronism between said distributors, frequency altering networks comprising one means directly responsive to said relay means for immediately and temporarily altering the frequency of said regulated source and another means comprising a motor operated network adjuster responsive to said relay means for gradually and permanently altering the frequency of said regulated source.

4. In a frequency regulating system, a source of frequency to be considered standard, a rotary distributor driven from said standard, another source of frequency to be regulated, a rotary distributor driven from said regulated source, a communication circuit including said rotary distributors, means responsive to communication signals transmitted over said circuit for indicating deviation from isochronism between said distributors, frequency altering networks for bringing said distributors into synchronism with each other and for compensating for the condition which caused said deviation, said signal responsive means simultaneously directly operating said synchronizing network and indirectly operating said compensating network, and a motor driven from said regulated frequency, said motor comprising said indirectly operating link between said signal responsive means and said compensating network.

5. In a frequency regulating system, a source of frequency to be considered standard, another source of frequency to be regulated, each said sources comprising a high frequency generator and a frequency converter for delivering a low frequency suitable for controlling rotary distributor communication apparatus, a rotary distributor driven from the low frequency output of said standard, a rotary distributor driven from the low frequency output of said regulated source, a communication circuit including said distributors, relay means responsive to communication signals indicating deviation from isochronism between said distributors, means for immediately and temporarily changing the high frequency generated by said regulated source, means including a motor operated by the low frequency output of said regulated source for gradually and permanently changing the high frequency generated by said regulated source, said relay means simultaneously operating said immediate and temporary frequency changing means and said gradual and permanent frequency changing means.

LARNED A. MEACHAM.